(12) United States Patent
Johnson et al.

(10) Patent No.: US 6,377,892 B1
(45) Date of Patent: Apr. 23, 2002

(54) INTEGRATED NAVIGATION SYSTEM

(75) Inventors: Cris W. Johnson; Kenneth W. McElreath, both of Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/563,311

(22) Filed: May 2, 2000

(51) Int. Cl.[7] ............................................... G01C 21/00
(52) U.S. Cl. .................... 701/213; 701/215; 342/357.12
(58) Field of Search ................................. 701/200, 207, 701/211, 213, 214, 215, 220, 221; 342/357.01, 357.02, 357.08, 357.12; 73/178 T

(56) References Cited

U.S. PATENT DOCUMENTS 5,184,304 A * 2/1993 Huddle ........................ 364/453
6,061,018 A * 5/2000 Sheynblat ............... 342/357.06
6,157,891 A * 12/2000 Lin ............................. 701/301
6,205,400 B1 * 3/2001 Lin ............................. 701/214

* cited by examiner

Primary Examiner—Yonel Beaulieu
(74) Attorney, Agent, or Firm—Nathan O. Jensen; Kyle Eppele

(57) ABSTRACT

An integrated navigation system includes a prime mission navigation system (e.g., a military code GPS-based flight management system), a second navigation system (e.g., a civil code GPS-based navigation system) and an integrity check system. The first navigation system receives first positioning signals and generates a first navigation solution based on the first positioning signals. The second navigation system receives second positioning signals and generates a second navigation solution based on the second positioning signals. The integrity check system receives the first navigation solution and the second navigation solution, compares the first navigation solution to the second navigation solution, and generates a validity signal based on the comparison.

30 Claims, 3 Drawing Sheets

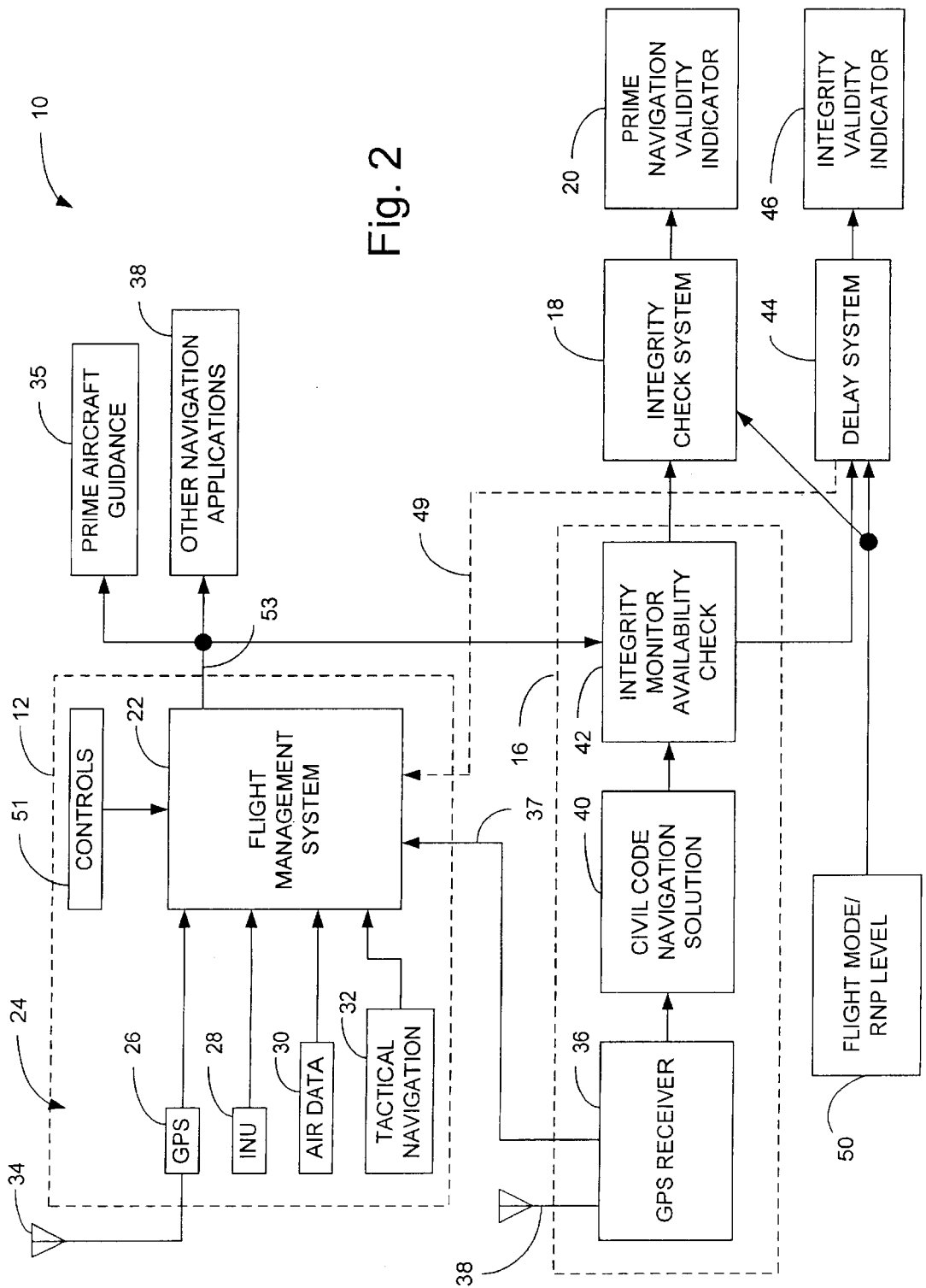

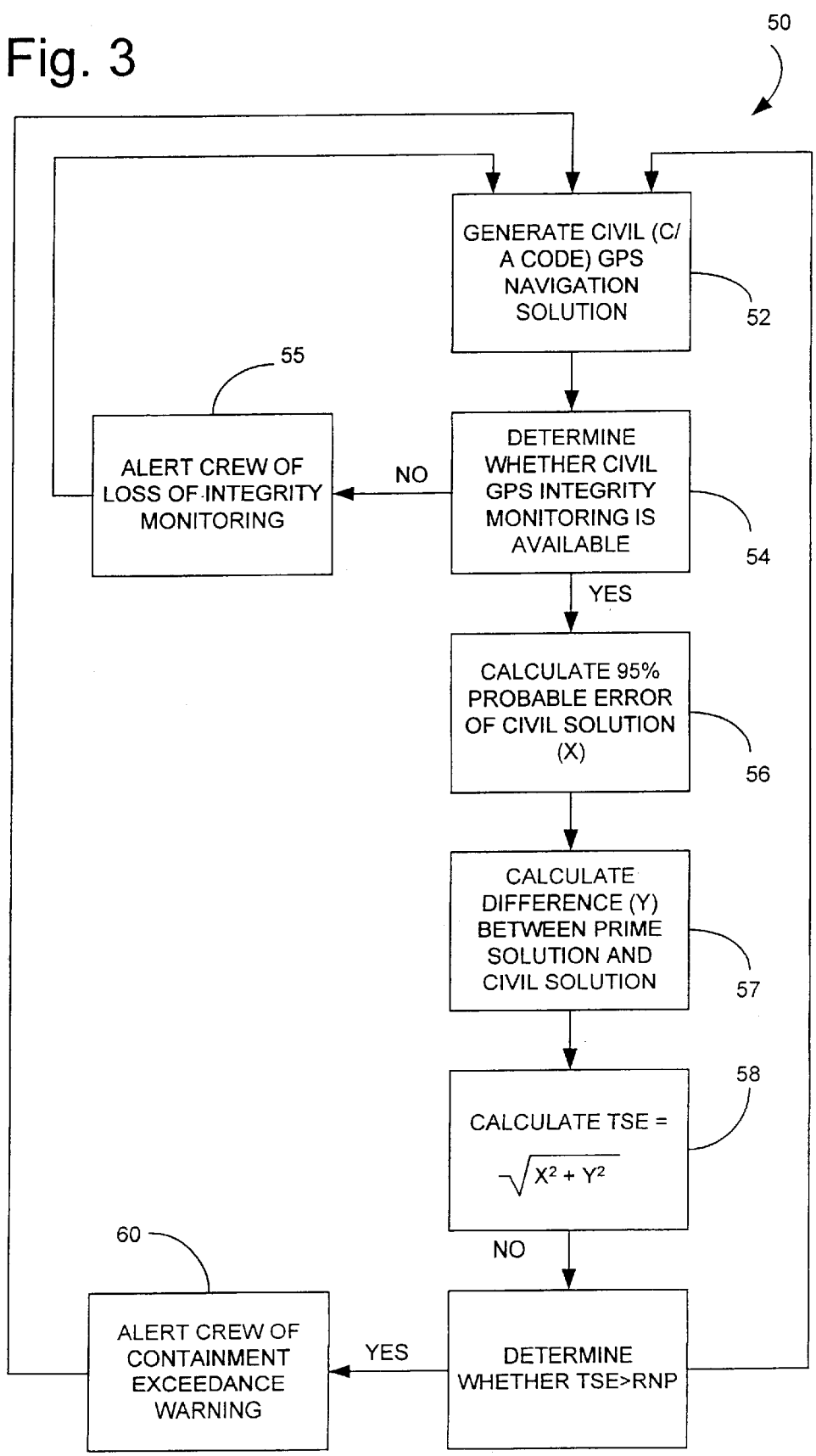

INTEGRATED NAVIGATION SYSTEM

FIELD OF THE INVENTION

The present invention relates generally to the field of navigation systems. More specifically, the present invention relates to navigation systems for determining a navigation solution for a mobile platform such as an aircraft. More specifically still, the present invention relates to a navigation system having integrated functionality of both civil and military navigation systems.

BACKGROUND OF THE INVENTION

Many military aircraft have a Global Positioning System (GPS)-based navigation system and/or other navigation system having unique anti-jamming, improved accuracy, and other capabilities. Military aircraft use the encrypted, military code (P/Y code) transmitted by GPS satellites to generate a navigation solution. A great deal of development effort has been invested in these military navigational systems over the years to integrate military code GPS receivers with other navigation devices, such as, inertial navigation units, air data, and tactical navigation devices, to form a combined, blended navigation system.

The United States Government has recently mandated that all military aircraft operating in civil airspace must meet many requirements of civil aircraft operating in the same airspace. Civil navigation systems have a GPS-based navigation system which utilize the civil code (C/A, or coarse/acquisition code) to determine a navigation solution. However, civil navigation systems are configured to perform a number of additional functions which are not required of military navigation systems, such as integrity monitoring. Typically, the Federal Aviation Administration (FAA) issues Technical Standard Orders (TSOs) requiring new functional requirements for aircraft operating in civil airspace. For example, Receiver Autonomous Integrity Monitoring (RAIM) was introduced as a requirement for all civil aircraft by the FAA in TSO-C129 in the early 1990s. Thus, existing military navigation systems must be reconfigured to perform a number of additional functions currently implemented in civil navigation systems.

As mentioned, the military code transmitted by GPS satellites is encrypted and, therefore, not available for non-U.S. military applications. The military code is also much more accurate (e.g., currently up to eight times more accurate in some systems) than the commercially available civil code. Many foreign countries have now forbidden any aircraft from utilizing the military code in their sovereign airspace since the foreign countries are unable to access the code and monitor it. This has resulted in some military aircraft having to take long detours around the sovereign airspace of these countries to reach the destination of the aircraft.

One solution to the above problems is to redesign the vast system development already done on the military navigation system to implement each of the functions required by the FAA and foreign governments. The navigation systems of the military aircraft would have to be redesigned to perform the necessary functions, utilizing the less accurate civil code as required. However, this approach is costly and inflexible. As air traffic becomes more congested, aircraft separation distances are decreasing, and the FAA is issuing additional requirements for aircraft navigation systems. Each new FAA requirement would require a new redesign of the military navigation system.

Even assuming the costly development were undertaken, additional problems persist. Although military GPS receivers are capable of using the civil code, it would be difficult to design a way of using the military code for military functions and the civil code for the required civil functions, primarily because GPS receivers cannot track both codes simultaneously. Further, a system would have to be developed for the FAA to approve and validate the military navigation system without breaching the security of proprietary military information.

Another solution is for military aircraft to avoid flying in civil airspace. While this may be possible for some aircraft, such as carrier-based fighter planes, cargo planes and surveillance planes often require clearance over civil and foreign airspace for daily, routine missions. Further, while oceanic airspace is the only place that currently authorizes GPS-only navigation, it is likely that the requirement of GPS navigation will spread to other regions of airspace in the years to come.

Accordingly, there is a need for an improved navigation system that integrates the functionality of multiple navigation systems. The integrated navigation system would be easily upgraded and relatively inexpensive to develop and implement. The integrated navigation system would also maintain much of the functionality of each component navigation system.

SUMMARY OF THE INVENTION

According to an exemplary embodiment, an integrated navigation system includes a first navigation system, a second navigation system, and an integrity check system. The first navigation system receives first positioning signals and generates a first navigation solution based on the first positioning signals. The second navigation system receives second positioning signals and generates a second navigation solution based on the second positioning signals. The integrity check system receives the first navigation solution and the second navigation solution, compares the first navigation solution to the second navigation solution, and generates a validity signal based on the comparison.

According to another exemplary embodiment, a system for providing integrity checking to an existing navigation system configured to generate a navigation solution is disclosed. The system includes a civil code GPS receiver operable in parallel with the existing navigation system. The civil code GPS receiver is configured to receive satellite signals and to generate location signals based on the satellite signals. The system further includes a means for checking the integrity of the navigation solution and for generating a validity signal representative of the integrity of the navigation solution.

According to yet another exemplary embodiment, in a navigation system having a military code GPS receiver configured to receive a military satellite signal and to generate first location signals based on the military satellite signals, an improvement for configuring the navigation system for operation in civil airspace is disclosed. The improvement includes a civil code GPS receiver configured to receive satellite signals having a civil code and to generate second location signals based on the civil code. The improvement further includes a means for receiving the second location signals and using the second location signals to perform a function required of a civil aircraft.

According to still another exemplary embodiment, a method of checking the integrity of a navigation system generating a first navigation solution based on first positioning data includes receiving second positioning data different from the first positioning data; generating a second navigation solution based on the second positioning data; comparing the second navigation solution to the first navigation solution; and generating an invalidity signal based on the comparison.

According to yet still another exemplary embodiment, an integrated navigation system includes a first receiver and a second receiver. The first receiver is configured to receive GPS satellite signals and to generate a first navigation solution. The second receiver is configured to receive the GPS satellite signals. The second receiver has a fault detection and exclusion algorithm configured to identify a faulty GPS satellite signal and to provide a fault signal to the first receiver. The first receiver is configured to exclude the faulty GPS satellite signal from the navigation solution.

BRIEF DESCRIPTION OF THE DRAWINGS

The invention will become more fully understood from the following detailed description, taken in conjunction with the accompanying drawings, wherein like reference numerals refer to like elements, and in which:

FIG. 2 is a more detailed block diagram of the integrated navigation system of FIG. 1; and FIG. 3 is a flowchart of a method of checking the integrity of a navigation solution according to an exemplary embodiment.

DETAILED DESCRIPTION OF THE EXEMPLARY EMBODIMENTS

Figure 1:
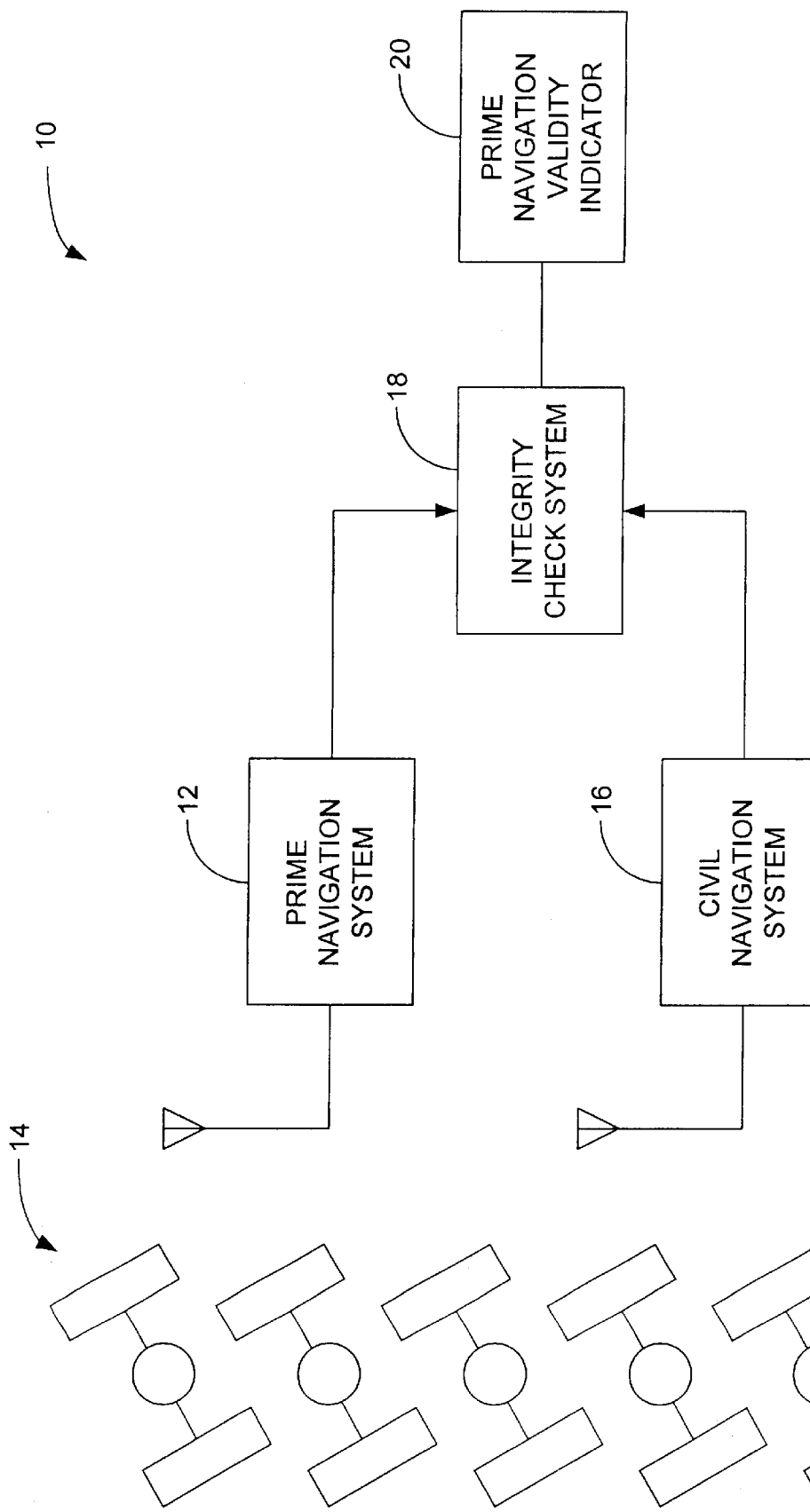
FIG. 1 is a block diagram of an integrated navigation system according to an exemplary embodiment.

Referring first to FIG. 1, a block diagram of an integrated navigation system 10 according to an exemplary embodiment is shown. In an exemplary application, navigation system 10 is mounted on a military unit, such as a military aircraft (e.g., a transport aircraft such as the KC-135) or vehicle. System 10 is preferably used to generate a navigation solution that may be used for aircraft guidance, weapon aiming, sensor positioning, etc. As an example, the USAF Joint STARS aircraft E8C may carry a synthetic aperture radar used to locate objects with great precision and to differentiate between objects (e.g., the difference between a tank and a truck). The location of the objects are determined relative to the aircraft and, therefore, the location of the aircraft must be known with great precision.

Navigation system 10 includes a prime mission navigation system 12, which can be an existing military navigation system on the military unit but may be other types of navigation systems, configured to generate a precise navigation solution. In this exemplary embodiment, prime mission navigation system 12 includes a GPS (Global Positioning System) receiver having a chip set capable of receiving and decrypting the military positioning data or code (P/Y code) within the positioning signals transmitted by GPS satellites 14. Alternative prime navigation systems may use navigation devices other than or in addition to GPS, such as very precise inertial navigation systems, dead reckoning, LORAN (Long-Range Radio Aid to Navigation), etc. System 12 uses digital and/or analog circuitry, software, and known techniques to generate a navigation solution based on the positioning signals. Any of the various known techniques may be implemented, including Differential GPS, interferometry, etc. to generate the prime navigation solution. Prime mission navigation system 12 may include, for example, a flight management system such as the FMS-800 manufactured by Rockwell Collins, Cedar Rapids, Iowa. Navigation system 12 is operable on land-, air-, or sea-based vehicles, such as transport aircraft, fighter planes, etc.

According to an advantageous feature of this exemplary embodiment, integrated navigation system 10 includes a civil navigation system 16 operable in parallel with the existing prime mission navigation system 12. Civil navigation system 16 includes a civil GPS receiver having a chip set capable of receiving the civil positioning data or code (C/A code) within the positioning signals transmitted by GPS satellites 14. Like system 12, system 16 uses digital and/or analog circuitry, software, and known techniques to generate a navigation solution based on the positioning signals, such as, Differential GPS, interferometry, etc. However, the signals are in general uncorrelated to those of prime mission navigation system 12. Unlike system 12, however, system 16 is configured to perform additional functions required for a civil aircraft. These functions include integrity-related functions (e.g., Receiver Autonomous Integrity Monitoring or RAIM, integrity monitoring availability, Wide Area Augmentation System or WAAS, or other integrity-related functions), Fault Detection and Exclusion (FDE), Automatic Dependent Surveillance, Required Navigational Performance (RNP), position reporting between aircraft, other Federal Aviation Administration (FAA) requirements for civil aircraft, other sovereign nation requirements of civil aircraft operating over foreign airspace, etc.

Since the FAA and various sovereign nations require special functions for civil aircraft, integrating a civil navigation system 16 with prime mission navigation system 12 provides for the necessary functionality from both systems. Prime mission navigation system 12 provides the required anti-jamming and position accuracy via the prime mission navigation solution, while civil navigation system 16 provides integrity checking and other requirements of civil aircraft via the civil navigation solution. Integrated navigation system 10 can be easily updated with new civil aircraft requirements by simply providing a software upgrade to civil navigation system 16.

As illustrated in FIG. 1, an integrity checking system 18 is implemented as one example of the functionality of integrated navigation system 10. Integrity checking system 18 includes software and/or hardware which may be loaded onto either of systems 12, 16, or onto another system (e.g. a separate Flight Management System, if applicable). Integrity checking system 18 compares the prime navigation solution from system 12 to the civil navigation solution from system 16. When the prime navigation solution has drifted outside of a predetermined distance from the civil navigation solution, integrity check system 18 generates a "containment alert" signal declaring that the prime navigation solution is invalid and provides this signal to a prime navigation validity indicator 20 so that the crew of the aircraft can be alerted. A more specific embodiment, including additional details, will now be described with reference to FIG. 2.

Referring now to FIG. 2, a block diagram of an integrated navigation system according to the exemplary embodiment of FIG. 1 is shown. Prime mission navigation system 12 includes a flight management system 22 and at least one of a plurality of navigation devices 24, such as, a GPS receiver 26, an inertial navigation unit 28, an air data unit 30, and a tactical navigation unit 32. GPS receiver 26 receives the military code portion of GPS satellite signals, generates location signals representative of the location of the aircraft, and provides the location signals to system 22. Inertial navigation unit 28, air data unit 30, and tactical navigation unit 32 all provide additional positioning signals to system 22. Based on these positioning signals and on a software program stored in memory, flight management system 22 generates a prime mission navigation solution. This solution is used for prime aircraft guidance 35 and other navigation applications 38, such as, sensor and weapon aiming, flight displays, etc. In one embodiment, the prime mission navigation solution is simply the location of the aircraft as determined by GPS receiver 26.

Civil navigation system 16 also includes at least one navigation device, e.g., a GPS receiver 36, configured to monitor the C/A or civil code portion of GPS satellite signals and generate location signals representative of the location of the aircraft. The location signals are used for an integrity monitor function, such as Receiver Autonomous Integrity Monitoring. The integrity of a navigation solution is its guarantee of accuracy or, more specifically, the ability to detect that a navigation solution is not providing the accuracy that it should, such as when a GPS satellite is displaced from its orbit or a satellite clock deviates from an accurate or true reading. GPS receiver 26 is not configured to detect this occurrence. However, GPS receiver 36 detects this occurrence via an integrity monitor function and adjusts the navigation solution generated by civil navigation system 16 by excluding this satellite from the solution computation.

GPS receiver 36 may be either a stand-alone receiver unit or an insertable data card inserted into GPS 26, such that both receivers 36 and 26 can operate via antenna 34. Further, the data card could include the functionality of integrity check system 18 and/or delay system 44, which will be described hereinafter.

Civil navigation system 16 is configured to check whether integrity monitoring is available at integrity monitor availability check 42. RAIM typically requires that GPS receiver 36 track five satellites of the proper geometry, etc., four for the position solution and one for the integrity checking function. For example, if only four satellites are being tracked, integrity monitoring is unavailable. In this exemplary embodiment, GPS receiver 36 generates an integrity monitor availability signal which indicates whether GPS receiver 36 is tracking enough satellites with the proper geometry, etc., to do integrity monitoring. The integrity monitor availability signal is sent through a delay system 44 to an integrity validity indicator 46. Indicator 46 includes a visible and/or audible indicator (e.g., a light emitting diode, a speaker, an icon on a computer screen, etc.) to alert the crew of the aircraft that integrity monitoring is unavailable.

Delay system 44 includes a circuit or code segment configured to receive the integrity monitor availability signal and only provide the signal to indicator 46 when the signal indicates that the integrity monitoring is unavailable for at least a predetermined time delay. The time delay prevents nuisance signals due to noise or interference, and may be fixed (for example, approximately 60 seconds) or variable.

In this embodiment, both the detection level of integrity check system 18 and the time delay in delay system 44 are variable and are based in part on the flight mode/RNP level (Required Navigational Performance) received from flight mode/RNP level source 50. Flight mode/RNP level refers to a standard including containment accuracy levels and crew alert time constraints based on the airspace in which the aircraft is located (e.g., "oceanic", "en route", "terminal", and "approach" airspace). For example, RNP 0.3 means there must be a 95% probability that the aircraft is actually located within 0.3 miles of the navigation solution. For oceanic travel, RNP 10 may be more appropriate, while some European countries require RNP 5. The flight mode/ RNP level also includes a crew alert time constraint, i.e., a required time period within which the flight crew must be alerted if integrity monitoring is unavailable. The required time period also depends on the flight mode (e.g., approach, en route, etc.). Thus, for an approach, the time period might be 30 seconds, while en route, the time period might be between 30 seconds and 2 minutes.

A civil navigation solution is computed at step 40 using location signals from GPS receiver 36. In one embodiment, the civil navigation solution is simply the location of the aircraft as determined by GPS receiver 36. If integrity monitoring is available as indicated by integrity monitor availability check 42, civil code navigation system 16 excludes any satellite signals lacking integrity from civil code navigation solution 40.

An integrity check system 18 receives both the prime mission navigation solution and the civil navigation solution and compares the two. Integrity check system 18 is a code segment, circuit, or some combination thereof operable with civil navigation system 16. Thus, integrity check system 18 may be part of system 16 or in a circuit separate from system 16. Integrity check system 18 may alternatively be part of prime mission navigation system 12. If the difference between the prime mission navigation solution and the civil navigation solution is greater than a predetermined radial (direct, straight-line) distance, an invalidity signal is sent to prime navigation validity indicator 20. Thus, the civil navigation solution provides a shell or a boundary outside of which the military navigation solution cannot go without triggering an alert. If a satellite is lost, the military navigation solution will be significantly different than the civil navigation solution, indicating an integrity problem. Indicator 20 includes a visible and/or audible indicator (e.g., a light emitting diode, a speaker, an icon on a computer screen, etc.) to alert the crew of the aircraft that the prime mission navigation solution is invalid.

The predetermined distance used to trigger the invalidity signal can be fixed or variable. If fixed, the predetermined distance is set larger than the normal difference in accuracy between GPS receiver 26 and GPS receiver 36. If variable as shown in the exemplary embodiment of FIG. 3, the predetermined distance is calculated in real time as a function of the difference in accuracy between the GPS receivers 26, 28, of the errors attributable to the satellite geometry and GPS receivers, and of the flight mode/RNP.

Referring now to FIG. 3, a flowchart of a method 50 for providing integrity checking in an integrated navigation system is shown wherein the aforementioned predetermined distance is variable. Method 50 is performed by a code segment or software algorithm within civil navigation system 16, but may alternatively be performed within prime mission navigation system 12 (e.g., in a flight management system), or by a separate processing circuit. At step 52, a civil code navigation solution is generated based on the satellite signals and/or location data provided by GPS receiver 36. At step 54, the C/A or civil GPS code is monitored, for example, by GPS receiver 36. If the civil GPS integrity monitoring is not available, then the crew is alerted at step 55. At step 56, the statistics (probable error limit) (X) of the civil solution are calculated. Although civil code GPS receiver 36 cannot calculate the actual errors in the civil navigation solution, it does calculate probable errors based on satellite geometry, and, more specifically, calculates the maximum error in the navigation solution with 95% probability.

At step 57, the difference (Y) between the prime mission navigation solution and the civil code navigation solution is calculated. If a mathematical combination (e.g., the root-sum-square (RSS)) of these two values is greater than a predetermined value (steps 58, 59), the flight crew is alerted at step 60. In other words:

$$TSE=\sqrt{X^2+Y^2}$$

where TSE is the total system error, X is the 95% statistically probable error of the civil navigation solution, and Y is the magnitude of the difference between the civil navigation solution and the military navigation solution. This equation is valid because the two values X and Y are statistically uncorrelated, mathematically. If the RSS is less than the predetermined value, the algorithm continues monitoring at step 52. While in this exemplary embodiment, the integrity of the prime mission navigation solution is checked by comparison to the civil code navigation solution, alternative methods of checking the integrity of the prime mission navigation solution are contemplated. For example, if prime mission navigation system 12 were configured to output pseudoranges for each tracked satellite, civil navigation system 16 could compare the pseudoranges of each satellite it is tracking (i.e., the same satellites as system 12) and the pseudoranges could be compared directly instead of or in addition to comparing the navigation solutions.

When the flight crew receives the alert (for example, via prime navigation validity indicator 20), the flight crew has several options. For example, the flight crew can continue to use the prime mission navigation solution and notify authorities that the FAA requirements of integrity checking are not being met. Alternatively, the flight crew can switch to using the civil navigation solution to operate prime aircraft guidance 35 and/or other navigation applications 38. The civil navigation solution is provided to flight management system 22, as indicated by dashed line 49 in FIG. 2. If the flight crew wishes to switch from the prime mission navigation solution to the civil navigation solution, the flight crew actuates a switch via controls 51, which sends a signal to flight management system 22 causing system 22 to switch the navigation solution on line 53 from the prime mission navigation solution to the civil navigation solution.

As mentioned, civil navigation system 16 may be configured via software and/or hardware systems to perform other functions required of civil aircraft instead of, or in addition to RAIM and integrity monitor availability. For example, civil navigation system 16 may be configured to perform Fault Detection and Exclusion, wherein GPS receiver 36 identifies if a satellite has a fault and provides a fault signal to prime mission navigation system 12 (e.g., to system 22 or GPS 26 via line 37). In response, prime mission navigation system 12 excludes the faulty satellite from the prime mission navigation solution.

An alternative to RAIM for integrity monitoring is Wide Area Augmentation System (WAAS), in which integrity monitoring is not done by GPS receiver 36 but by a ground based integrity monitoring system. The ground based integrity monitoring system communicates signals to civil navigation system 16 indicating whether each satellite in the GPS system is good or bad. GPS receiver 36 can then correct the civil navigation solution based on this data. WAAS also helps improve the accuracy of the civil navigation solution.

A further function required of civil aircraft is Automatic Dependent Surveillance (ADS). Civil navigation system 16 may be configured to automatically and/or periodically report the military navigation solution or civil navigation solution to a ground based station. ADS is currently being implemented over oceanic airspace, but may soon be required over land.

A further function required of civil aircraft is position reporting between aircraft. Civil navigation system 16 may be configured to report the military navigation solution or civil navigation solution to other aircraft. Additional functions required of civil aircraft are evolving and it is contemplated that these functions may also be easily integrated into system 10 by, for example, software upgrades and minimal reconfiguration to civil navigation system 16.

An integrated navigation system has been disclosed which combines the functionality of a civil navigation system with a prime mission navigation system, such as a military navigation system. In some exemplary embodiments, the civil navigation system allows the integrated navigation system to comply with various FAA regulations by adding integrity checking or other civil aircraft functions. In some exemplary embodiments, the civil navigation system allows the integrated navigation system to comply with requirements of foreign countries. As additional civil aircraft functions are added, updates to civil navigation system 16 are relatively inexpensive compared to completely redesigning the prime mission navigation system.

While the exemplary embodiments have been illustrated and described, it should be understood that the embodiments disclosed herein are offered by way of example only. For example, systems 12, 16, 18, and 44 may be embodied in any of a number of hardware and/or software configurations and mounted in one housing or multiple housings. Furthermore, the method and system disclosed may operate additional or alternative functionalities to comply with future U.S. Government or foreign nation requirements. The invention is not limited to a particular embodiment, but extends to various modifications that nevertheless fall within the scope of the appended claims.

What is claimed is:

1. An integrated navigation system, comprising:
    a first navigation system configured to receive first positioning signals and to generate a first navigation solution based on the first positioning signals;
    a second navigation system configured to receive second positioning signals and to generate a second navigation solution based on the second positioning signals; and
    an integrity check system configured to receive the first navigation solution and the second navigation solution, to compare the first navigation solution to the second navigation solution, and to generate a validity signal indicating that one of the first and second navigation solutions is invalid based on the comparison.

2. The integrated navigation system of claim 1, wherein the second navigation system includes a civil code GPS receiver.

3. The integrated navigation system of claim 2, wherein the first navigation system includes a military code GPS receiver.

4. The integrated navigation system of claim 3, wherein the first positioning signals and the second positioning signals include GPS satellite signals, the second navigation system configured to identify one of the GPS satellite signals as having a fault and to provide a fault signal to the first navigation system, the first navigation system configured to exclude the one GPS satellite from the first navigation solution.

5. The integrated navigation system of claim 1, wherein the validity signal indicates that the first navigation solution is invalid when the first navigation solution is greater than a predetermined distance from the second navigation solution.

6. The integrated navigation solution of claim 5, wherein the validity signal indicates that the first navigation solution is invalid when a mathematical combination of the difference between the first and second navigation solutions and the probable statistical errors of the second navigation solution exceed a predetermined value.

7. The integrated navigation system of claim 5, wherein the predetermined distance is based on a Required Navigation Performance level.

8. The integrated navigation system of claim 1, wherein the second navigation system is configured to determine whether an integrity check is available based on the second positioning signals and to generate an integrity monitor availability signal based on the determination.

9. The integrated navigation system of claim 1, further comprising an indicator selected from the group consisting of a visible indicia and an audible indicia, wherein the indicator is actuated by the validity signal.

10. The integrated navigation system of claim 1, wherein the first navigation system includes a flight management system.

11. The integrated navigation system of claim 1, wherein the first positioning signals include signals from an inertial navigation unit.

12. A system for providing integrity checking for an existing navigation system configured to generate a navigation solution, the system comprising:
    a civil code GPS receiver operable in parallel with the existing navigation system, the civil code GPS receiver configured to receive satellite signals and to generate location signals based on the satellite signals; and
    means for checking the integrity of the navigation solution and for generating a validity signal representative of the integrity of the navigation solution.

13. The system of claim 12, further comprising means for determining whether integrity monitoring is available and for generating an integrity monitoring availability signal based on the determination.

14. The system of claim 12, the existing navigation system generating a navigation solution, wherein the means for checking compares the location signals to the navigation solution and generates the validity signal based on the comparison.

15. The system of claim 12, the existing navigation system having a GPS receiver, wherein the civil code GPS receiver is located on a data card configured to be inserted into the GPS receiver.

16. The system of claim 12, the existing navigation system configured to receive the satellite signals and to generate first pseudoranges for a plurality of satellite signals, wherein the civil code GPS is configured to generate second psuedoranges, wherein the means for checking compares the first pseudoranges to the second pseudoranges and generates the validity signal based on the comparison.

17. In a navigation system having a military code GPS receiver configured to receive a military satellite signal and to generate first location signals based on the military satellite signals, an improvement for configuring the navigation system for operation in civil airspace, wherein the improvement comprises:
    a civil code GPS receiver configured to receive satellite signals having a civil code and to generate second location signals based on the civil code; and
    means for receiving the second location signals and using the second location signals to perform a function required of a civil aircraft.

18. The navigation system of claim 17, wherein the function includes Receiver Autonomous Integrity Monitoring (RAIM) and Fault Detection and Exclusion (FDE).

19. The navigation system of claim 17, wherein the function includes Automatic Dependent Surveillance.

20. The navigation system of claim 17, wherein the function includes position reporting among aircraft.

21. A method of checking the integrity of a navigation system generating a first navigation solution based on first positioning data, comprising:
    receiving second positioning data different from the first positioning data;
    generating a second navigation solution based on the second positioning data;
    comparing the second navigation solution to the first navigation solution; and
    generating an invalidity signal based on the comparison.

22. The method of claim 21, wherein the second positioning data include civil code GPS data.

23. The method of claim 22, further comprising:
    calculating a mathematical combination of the difference between the first and second navigation solutions and the probable statistical errors of the second navigation solution; and
    generating the invalidity signal when the mathematical combination exceeds the predetermined value.

24. The method of claim 23, further comprising periodically reporting one of the first navigation solution and the second navigation solution to a ground based station.

25. The method of claim 24, further comprising periodically reporting one of the first navigation solution and the second navigation solution to nearby aircraft.

26. An integrated navigation system, comprising:
    a first receiver configured to receive GPS satellite signals and to generate a first navigation solution;
    a second receiver configured to receive the GPS satellite signals, the second receiver having a fault detection and exclusion algorithm configured to identify a faulty GPS satellite signal and to provide a fault signal to the first receiver, the first receiver configured to exclude the faulty GPS satellite signal from the navigation solution.

27. The integrated navigation system of claim 26, wherein the first receiver is configured to generate the first navigation solution based on the military code of the GPS satellite signals.

28. The integrated navigation system of claim 27, wherein the second receiver is configured to generate the second navigation solution based on the civil code of the GPS satellite signals.

29. The integrated navigation system of claim 28, wherein the second receiver includes means for performing a function required of a civil aircraft.

30. The integrated navigation system of claim 29, wherein the function includes integrity monitoring.

* * * * *